Dec. 13, 1938. E. LITTLE 2,140,160
MEAT TENDERER
Filed Nov. 1, 1935
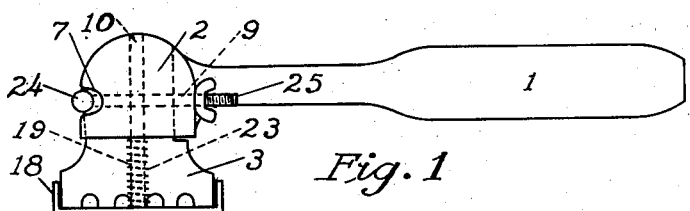
Fig. 1
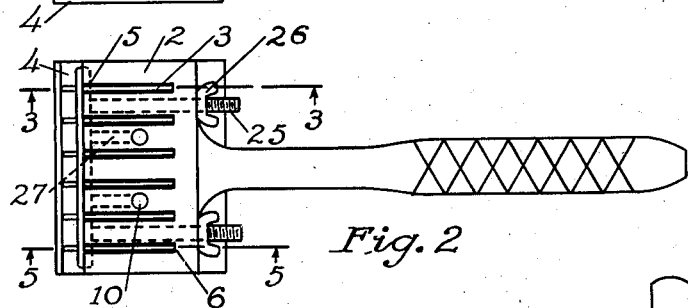
Fig. 2
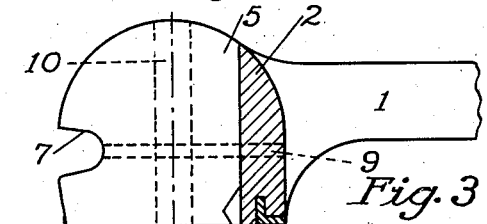
Fig. 3
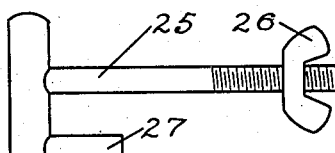
Fig. 4
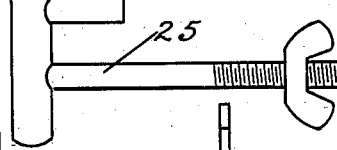
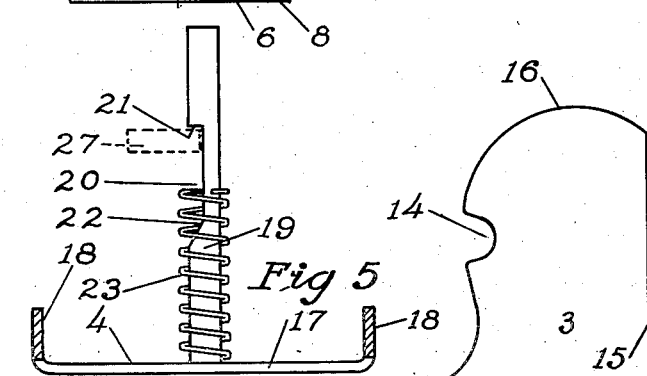
Fig. 5  Fig. 7  Fig. 7a
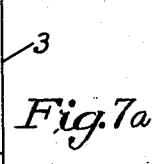
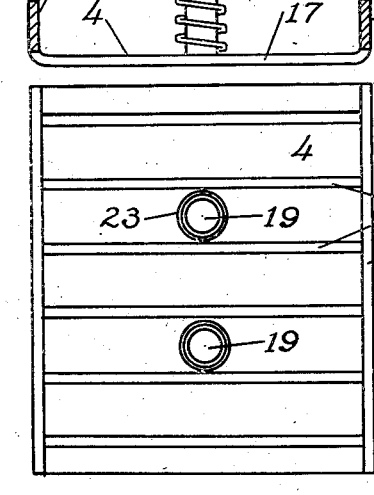
Fig. 6
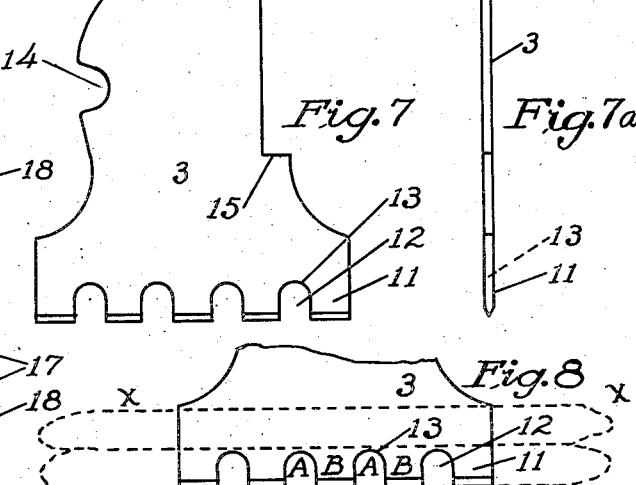
Fig. 8
INVENTOR
EDWARD LITTLE
BY
George B. Willson
ATTORNEY Patented Dec. 13, 1938

2,140,160

UNITED STATES PATENT OFFICE 2,140,160

MEAT TENDERER

Edward Little, Saginaw, Mich.

Application November 1, 1935, Serial No. 47,859

14 Claims. (Cl. 17—30)

This invention relates to improvements in meat tenderers of the mallet type wherein the head is provided with a plurality of downwardly projecting cutting blades, and a spring-pressed stripper plate is provided to clear the blades of adhering particles.

The improvements pertain to a new and useful blade structure, a novel way of mounting the blades in the head, and improved means for easily and quickly fastening them in place or releasing them.

A commercially important feature of my improvement is that the individual parts are simple and relatively inexpensive to manufacture; consequently any part, a blade for example, can be replaced at small cost.

Among the novel structural features of my invention are: improved arrangement of the cutting blade elements, in their relation to the stripper plate, whereby an operation known in the meat trade as "stitching", that is, uniting together two or more thin pieces of meat to make a thick one, can be performed quickly and effectively; an improved arrangement of the stripper plate scraping surfaces whereby, at each operation of the implement, all material is removed from both faces of each blade; means for halting the upward movement of the stripper plate toward the head, by providing an abutment having wedging or cam-like action that serves to avoid breakage when the stripper plate is driven up unusually hard, as sometimes happens when the plate strikes an upstanding piece of bone; blades of a new and advantageous shape whereby each blade presents a shoulder that takes against a corresponding shoulder on the head, and also has a recess that receives a shock-absorbing bar whereby the shocks of impact are transmitted directly to the head without setting up harmful strains in the individual blades; an improved device for tightly locking all of the blades to the head by drawing each blade rearwardly against the rear wall of the slot, the arrangement of this locking device being such that it can be released easily and quickly, allowing the blades to drop out of the head along with the stripper plate, thus completely disassembling the implement, so that all its parts can be thoroughly cleaned, individually.

With the above and certain other objects in view, which will appear later in the specification, my invention comprises the devices described and claimed and the equivalents thereof.

Fig. 1 is a side view of a meat tenderer embodying my invention.

Fig. 2 is a top plan view.

Fig. 3 is a part sectional detail view of the head, the section being taken on line 3—3 of Fig. 2.

Fig. 4 is an enlarged plan view of the locking device for fastening the blades and stripping plate to the head.

Fig. 5 is an enlarged sectional view of the stripper plate, taken on line 5—5 of Fig. 2.

Fig. 6 is a plan view of the parts shown in Fig. 5.

Fig. 7 is a side view of a blade.

Fig. 7a is an edge view of the parts shown in Fig. 7.

Fig. 8 is a diagrammatic view of the lower end of a blade, the dotted lines showing its mode of operation when fastening together overlapping pieces of meat, such as thin steaks.

The implement, in the preferred form chosen for illustration, consists of a handle 1 and a T-head 2, preferably cast integral; a plurality of removable blades 3; a spring-actuated stripper plate 4 mounted on the head and slidable up and down both faces of each cutter blade; and a one-piece locking device for releasably securing the blades and stripper plate to the head, and having stop means for limiting the range of up-and-down clearing movement of the stripper.

The head 2 is formed with a plurality of slots 5 spaced apart and located in planes parallel with the handle 1. The slots, as shown in Fig. 3, extend through the head from top to bottom and from the front of the head back almost to the handle 1. Thus is presented an upright guiding and abutment wall 6 for the blade at the rear of each slot 5. A horizontal channel 7 is formed in the front wall of the head, and the rear bottom edge of the head is provided with a wear-resisting reinforcing member 8, preferably of L-shaped cross section, as shown in Fig. 3, presenting a substantially horizontal hardened abutment shoulder to take the upward shock of the blades in use. From channel 7 horizontal holes 9 extend rearwardly through the head to receive tie-bolts for releasably locking the blades in the head, and intermediate horizontal holes are provided to take detent bars that limit the travel of the stripper. Upright holes 10 are formed in the head between slots 5 to take guide rods that carry the stripper plate 4.

Each blade 3 is a flat piece of metal, its lower edge being provided with chisel-shaped cutters 11 alternating with upwardly extending slits 12. Each slit is formed with an upwardly convergent top edge 13, being of arch shape in the form illustrated. This convergent or arched shape of the upper margins of slits 12 enables the blade to perform the new and useful "stitching" function previously alluded to. In the stitching operation the fibres of the two pieces become interlocked, apparently by the action of the cutters 11, accompanied by the downward and inward driving and compacting effect of the arched tops 13 of the slits 12. As shown in Fig. 7, the forward edge of each blade 3 is formed with a recess 14 which registers with the horizontal channel 7 of the head when the blade is in place, as shown in Fig. 1, and the rear edge is formed with a shoulder 15 that takes against the abutment member 8. The top edge 16 of the blade is shaped to the contour of the top of head 2.

Stripper plate 4 is a flat horizontal pressure plate formed with slots 17, through which the blades 3 operate so as to be cleared of adhering material. The front and rear edges of stripper 4 have upwardly projecting flanges 18 that embrace the front and rear marginal edges of blades 3. These flanges serve as guides for the stripper plate during its up-and-down movement.

One or more upright guide rods 19, Fig. 5, are fixed at their bottom ends to the stripper plate 4 and extend slidably through the upright holes 10 in head 2. Longitudinal recesses 20 are formed on the front faces of rods 19, presenting square shoulders 21 at their upper ends and downwardly and forwardly sloping shoulders 22 at their lower ends. The shoulders 21 and 22 limit respectively the downward and upward movements of the stripper plate. Compression springs 23 surround the guide rods 19, their lower ends being fastened to the stripper plate, their upper ends pressing against the bottom face of head 2, as shown in Fig. 1.

A preferred form of locking device for fastening the blades and stripping plate to the head is shown in Fig. 4, consisting of a horizontal bar 24 removably received in the horizontal channel 7 in the front wall of the head, and one or more tie-bolts 25 are fixed to the bar and arranged to project through the horizontal holes 9 in the head. The tie-bolts are provided with wing nuts 26. One or more detent pins 27 project rearwardly from bar 24 into holes provided in the head, their free ends being received respectively in the longitudinal recesses 20 of guide rods 19, thus securing the stripper to the head and limiting its travel in the manner indicated by dotted lines in Fig. 5.

To assemble the implement, the stripper plate 4 and the locking bar 25 may be put in place on the head. The blades 3 can then be inserted by simply turning the head upside down and dropping them into the respective slots 17 and 5. The shoulder 15 of each blade takes against the shoulder portion of the head. Recess 14 of the blade is then in register with the horizontal channel 7 of the head. The locking device is fastened by tightening the wing nuts 26.

The function and mode of operation of the device will now be described.

Material to be treated, say, a steak, is placed on a meat block, and the implement is used as a mallet to pound it, in known manner. At each blow the working face of the stripper plate strikes the steak flatwise. Springs 23 compress and hold the plate against the surface of the meat while the chisel-edged cutters 11 drive through and sever the meat fibres. The cuts thus made by each blade are spaced apart in a broken line, and the upper parts of the intermediate uncut portions are driven down and compressed by the parts 13.

If two thin steaks are laid one upon the other as indicated by dotted lines in Fig. 8, the upper edges that define slits 12 apparently force downward and draw together those uncut fibres that lie between the cutters 11, with the result that the fibres of the upper and lower layers of meat are intermingled in such a manner that the two thin steaks become fastened together as one. Pieces of meat united in this way can be handled in market and kitchen as if they were a single thick steak.

This "stitching" action is likewise advantageous when it is desired to fasten together a number of small pieces of meat, such as minute steaks. In that case the small pieces are laid out on the block with their edges overlapping and the whole surface is pounded in the manner described. Any number of small pieces can be so strongly united that the whole can be picked up by its edge and will hold together as though it were a single steak.

The total upward travel of stripper 4 is from the edges of cutters 11 to approximately the line $x$—$x$, Fig. 8, which is about twice the height of the slits 11; consequently, the non-sharpened edges 13 press down into the meat, between the full-depth cuts produced by the chisel-shaped edges 11. The effect appears to be to force the unsevered fibres downward and laterally into the cuts. For example, the fibres in zones A are suddenly and violently compressed. They are also forced together by the top edge part 13 of each slit 12, this part being preferably, although not necessarily, convergent or arched. The fibres in adjacent zones B are completely severed by the cutters without any great amount of downward compression having been produced in them by the action of blades 3. The result is the unique "stitching" effect above-mentioned. Presumably, it is in part brought about by the shifting of the unsevered fibres under the compressive action of the upwardly convergent edges of the parts 13, and perhaps also in part because the slits 12 are of less height than the total thickness of the meat. The exact action is immaterial, however, since the results are as stated.

Vertical shocks resulting from the downward blows of the implement are transferred from the blades directly to the head by means of shoulder 15 and by the walls of recesses 14 through the bar 24 to the upper wall of channel 7. Horizontal shocks in one direction are taken by the bar 24 and those in the other direction by the upright walls 6.

If it happens that an upwardly projecting piece of bone or other hard object lying between two blades is encountered by the stripper plate 4, the plate is driven upward and the tapered shoulders 22 on the stripper plate guide rods 19 then exert a cam-like effect against the ends of detent pins 27. The cam action tends to thrust the pin endwise so the strain is transferred to bar 24. The tie bolts 25 hold the bar and thus a powerful brake-like effect is produced, preventing accidental injury to the working parts.

After delivering its blow the implement is lifted. Springs 23 return the stripper to its original position, scraping off particles of material that may have attached themselves to the blades. The clearing action is thorough because both sides of each blade are scraped by the two edges of slot 17 in stripper 4. When the springs 23 have pushed the stripper plate down to its original position, Fig. 1, the shoulders 21 on rods 19 come down upon the ends of the detent pins 27, as is shown in Fig. 5, and halt the plate.

To take the tool apart for cleaning, wing nuts 26 are loosened and locking bar 24 is moved forwardly, that is, to the left in Fig. 1, clear of the blade recesses 14, thereby releasing the blades. By the same movement of bar 24 the detent pins 21 are withdrawn from the guide rod recesses 20, thereby releasing the stripper plate from the head. Thus a single movement of horizontal bar 24 releases all the working parts so they can drop into a cleaning bath.

Having thus described my invention, what I claim and desire to secure by Letters Patent is:

1. In a meat tenderer including a head having parallel slots, and flat blades removably received therein, means for locking the blades in place comprising a horizontal channel formed in the face of the head, a recess in each blade positioned to register with said channel, an upright wall on the head at the rearward end of each slot and opposite the said channel, a horizontal bar received in said channel and in the said recesses of the blades, and means releasably securing the bar in the channel, a spring-pressed stripper plate formed with slots to slidingly receive the blades, an upright guide rod secured to the stripper plate and slidingly received in a hole provided in the head, said rod being formed with abutment shoulders spaced apart, and a detent pin on said horizontal bar adapted to be engaged by said abutment shoulders at the upper and lower limits of travel of said stripper plate.

2. In a meat tenderer having a T-head formed with parallel slots spaced apart, and an upright wall at the rearward edge of each slot, and having blades receiving in said slots, in combination, shoulders on the rearward lower edge of the head adjacent said upright walls, shoulders on said blades adapted to engage the shoulders on the head, a horizontal channel formed in the front wall of the head and intersecting said slots, and blade locking means comprising a bar received in said channel, and means for clamping said bar to the head and against said blades at their outer marginal edges.

3. In a meat tenderer including a head formed with parallel slots spaced apart and having an upright guide wall at the rearward end of each slot and having a horizontal channel formed in the front wall of the head and extending across said slots, flat blades removably received in said slots, each blade having its working edge formed with chisel-shaped cutters alternating with upwardly extending slits, the rearward edge of each blade taking against said upright guide wall and presenting a shoulder against the bottom face of the head, the forward edge of each blade being formed with a recess positioned to register with the said horizontal channel in the head, and locking means removably received in said channel and said recesses.

4. A meat tenderer including a head, spaced blades thereon, a stripper plate slidably engaging said blades and having an upright guide rod slidably mounted in the head and formed with a longitudinal recess, a detent pin mounted in the head and projecting into the recess of said rod, and a downwardly and outwardly sloping shoulder on said guide rod, at the lower end of the recess, adapted to engage the end of the detent pin with a cam-like wedging action, whereby upward movement of the stripper plate is checked without harmful impingement.

5. In combination, a head formed with slots, a flat blade removably received in each slot, a stripper having an upright guide rod slidable in the head, shoulders on said rod, and fastening means for securing the blades and stripper to the head, and for simultaneously releasing the same, comprising a bar arranged to keep the head and blades in mutually locked relation, a tie bolt releasably securing said bar to the head, and a detent pin on said bar in the path of movement of the shoulders on said upright guide rod.

6. A detachable blade adapted to be inserted in the slotted head of a meat tenderer and to be releasably held therein by a removable bar; said blade consisting of a flat metal plate, the rear edge portion of which is formed to present a rearwardly extending horizontal shoulder appropriately positioned to abut against the bottom face of the said slotted head, and also presenting a rear abutment wall extending upwardly from said shoulder and positioned to take against a rear end wall of a slot in said head, a portion of the plate above and forward of the rearwardly extending shoulder being formed with an aperture for removably receiving the said bar.

7. In a meat tendering implement comprising a T-head with blades secured therein in spaced relation, said blades having chisel-shaped tendering teeth alternating with slits having convergent non-sharpened upper marginal edges, said implement also comprising a spring-pressed stripper plate movable on the head and having slots through which the blades project; in combination, stop means associated with the stripper plate and head, said stop means being arranged and adapted to halt upward travel of the stripper plate in relation to the blade at a distance above the cutting edges of the teeth, approximately twice the height of the slits, whereby unsevered fibres of material are forced into interengagement with adjacent severed fibres to unite two pieces of material.

8. In a meat tenderer having a T-head and cutting blades releasably mounted therein, each blade comprising a flat piece of sheet metal having cutters on its bottom horizontal edge and on its rear edge a rearwardly projecting shoulder, the blade also having an aperture forward of said shoulder; said T-head having spaced parallel slots extending vertically therethrough and extending from the front face of the head rearwardly to adjacent the back wall thereof, a hardened abutment member secured to the bottom face of the head rearward of said slots and positioned to be engaged from below by the shoulders of the blades; said head having a bar-receiving passage alined with the apertures in the blades; a bar removably received in said passage and projecting through the blades, and means releasably securing said bar to the head.

9. A meat tenderer having, in combination, a T-head with spaced parallel slots extending from the front face rearwardly to adjacent the back wall thereof and presenting an abutment at the rear bottom horizontal edge portion of the head, said head having parallel with its front face a horizontal bar-receiving passage, blades removably received in the slots of the head, each blade comprising a flat piece of sheet metal having cutters on its bottom marginal edge and having a rearwardly projecting shoulder engaging the said abutment of the head from below, each blade having an aperture forward of said shoulder; a removable bar received in said passage and extending through the apertures of the blades, and fastening means releasably securing said bar and head together.

10. A meat tendered having in combination, a head formed with slots spaced apart, a flat blade removably received in each slot, a spring-actuated stripper including a plate having upright guide members slidable in the head and presenting stops, and a bar on the head arranged to engage and normally keep the head, the blades and the stripper in mutually co-operative relation, said bar also being adapted to simultaneously release the blades and stripper when the bar is removed from the head, parts on said bar being disposed in the path of movement of the guide members to limit the extent of movement of the stripper plate.

11. A meat tenderer having, in combination, a head formed with slots spaced apart, a flat blade removably received in each slot, a stripper having upright guide members slidable in relation to the head and blades, a bar arranged to normally keep the head, the blades and the stripper in mutually operative relation and to release them simultaneously, parts of said bar being disposed in the path of movement of the said upright guide members, and arranged to limit the movement of the stripper, and fastening means releasably securing the bar to the head.

12. In a meat tenderer, in combination, a T-head, a plurality of removable blades received in spaced slots formed in the head, a spring-actuated stripper plate slidingly mounted on the head for up and down movement adjacent each blade, a bar removably mounted in the head and engaging the blades to hold them in place in the head, means on the head releasably retaining the bar therein, and stop means associated with the stripper plate and bar adapted to halt the respective up and down movements of the plate at predetermined positions, whereby the bar is adapted to hold the blades in place.

13. A meat tenderer including a T-head formed with multiple upright slots, toothed blades slidingly received in said slots, each blade formed with a projection bearing upwardly against the under face of the head, and a bar removably secured to the head and releasably engaging each blade, said bar, upon removal from said head being adapted to release all of said blades from their respective slots.

14. A meat tenderer comprising a head formed with spaced parallel slots extending from top to bottom therethrough and from the front face thereof rearwardly and terminating in upright walls, the bottom edge of the head rearward of said upright walls presenting a substantially horizontal shoulder, said head having a passage therethrough forwardly of said shoulder and perpendicular to the planes of said slots, a bar removably received in said passage; a blade removably mounted in each slot, being apertured to receive said bar and having at its rearward edge a shoulder extending under the shoulder of the head and engaging the same in such manner as to transmit shocks from the shoulder of the blade to the shoulder of the head.

EDWARD LITTLE.